United States Patent [19]
Keibler

[11] Patent Number: 5,195,381
[45] Date of Patent: Mar. 23, 1993

[54] LEVER FORCE GAUGE

[75] Inventor: Gregory S. Keibler, Everett, Wash.

[73] Assignee: The Boeing Company, Seattle, Wash.

[21] Appl. No.: 769,039

[22] Filed: Sep. 30, 1991

[51] Int. Cl.$^5$ .............................................. G01L 5/22
[52] U.S. Cl. ............................. 73/862.05; 73/862.541
[58] Field of Search .......... 73/862.541, 178 T, 862.391, 73/862.632, 862.639, 862.05

[56] References Cited

U.S. PATENT DOCUMENTS

| | | | |
|---|---|---|---|
| 3,729,990 | 5/1973 | Oliver | 73/862.05 |
| 3,835,702 | 9/1974 | Van Patten | 73/862.05 |
| 4,437,351 | 3/1984 | McGann et al. | 73/862.05 |
| 4,758,692 | 7/1988 | Roeser et al. | 73/862.05 X |

FOREIGN PATENT DOCUMENTS

| | | | |
|---|---|---|---|
| 2412833 | 8/1979 | France | 73/862.05 |
| 0714188 | 2/1980 | U.S.S.R. | 73/862.05 |

OTHER PUBLICATIONS

A Stick-Force Indicator for Aircraft, Cordero et al., pp. 56-57, Jan. 1955.

*Primary Examiner*—Donald O. Woodiel
*Assistant Examiner*—Elizabeth L. Shopbell
*Attorney, Agent, or Firm*—J. Michael Neary; B. A. Donahue

[57] ABSTRACT

A lever force gauge, for measuring the force necessary to pivot a lever, includes a connector for attaching the device to the end of a lever, and a positioner to which a load cell is attached for producing an electrical signal indicative of the force exerted by the operator to move the lever. The positioner is pivotally attached to the connector in such a way that it can be pivoted to any of three positions to orient the load cell in the desired direction to exert a force on the load cell to move the lever and measure the force exerted before the lever moved. The load cell is connected via an electrical cable to an instrument that records and displays the peak force exerted on the load cell to move the lever.

20 Claims, 7 Drawing Sheets

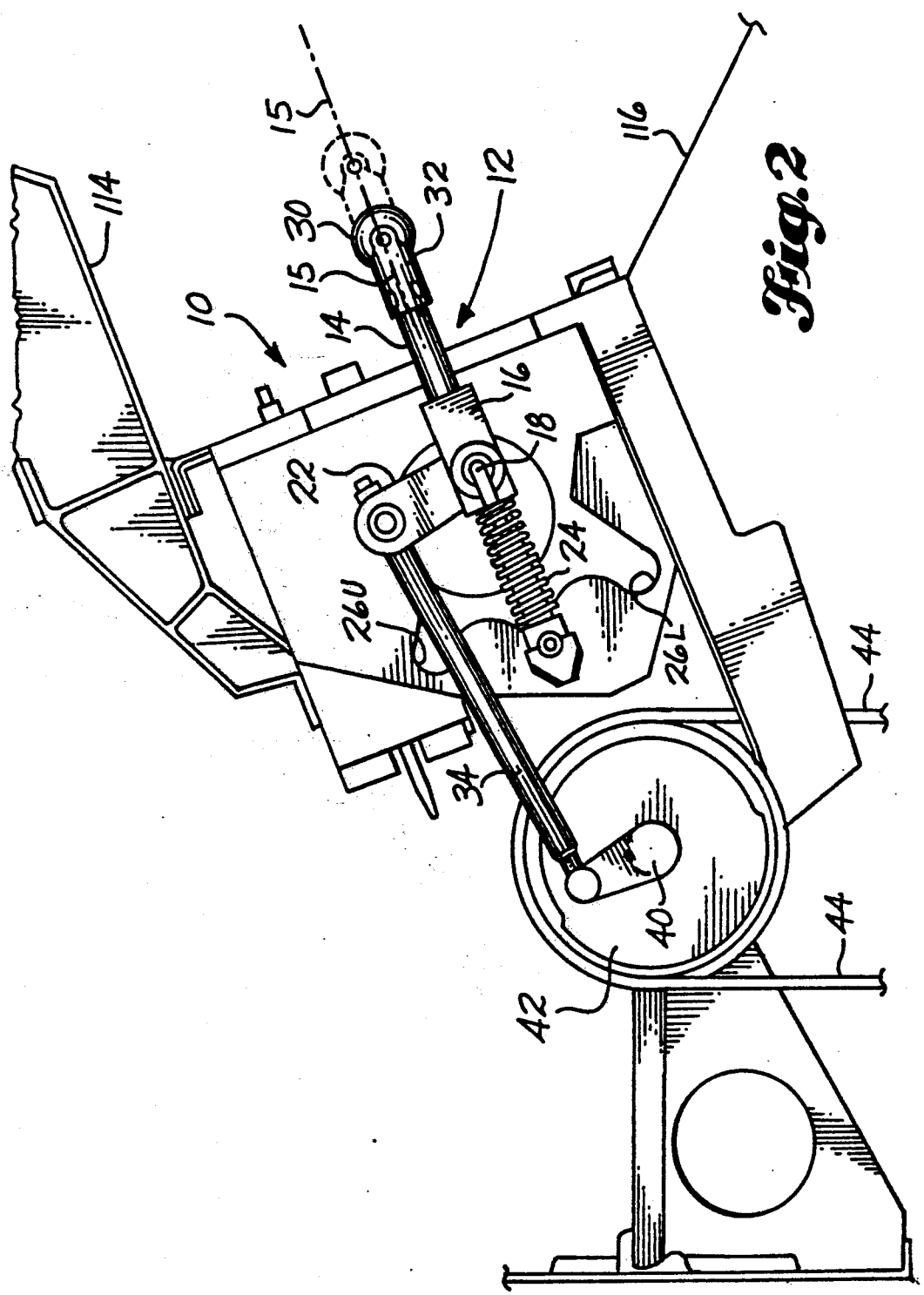

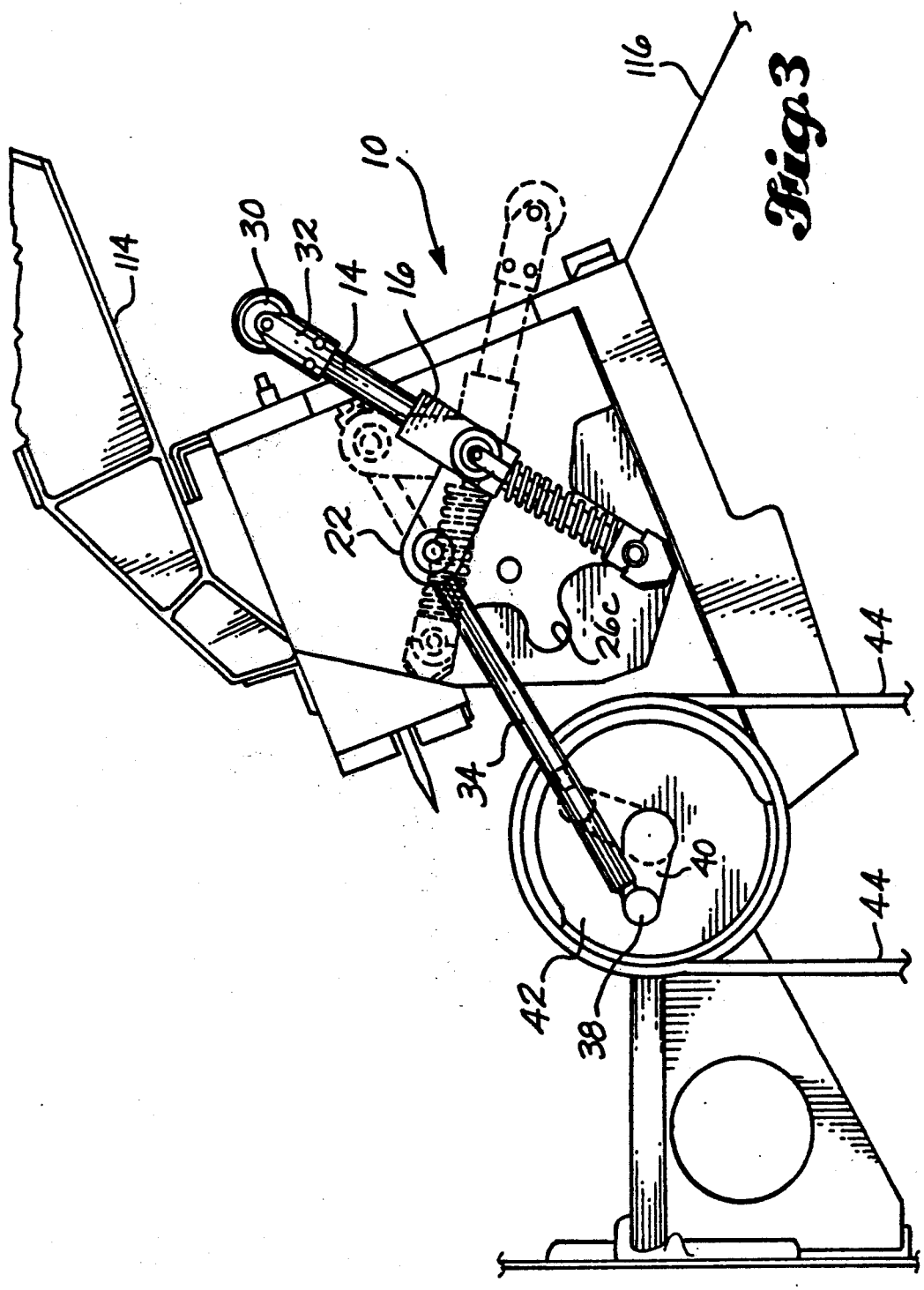

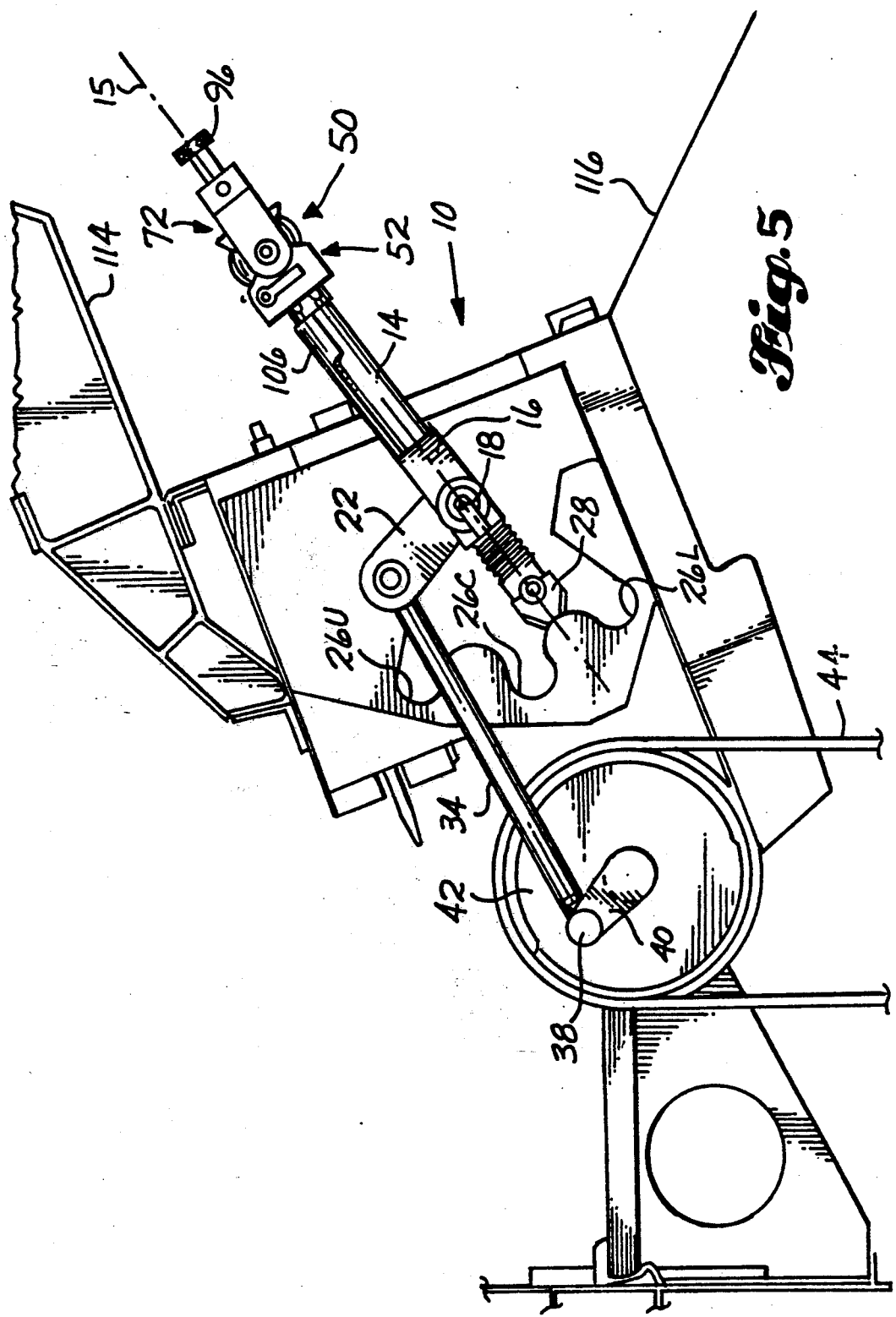

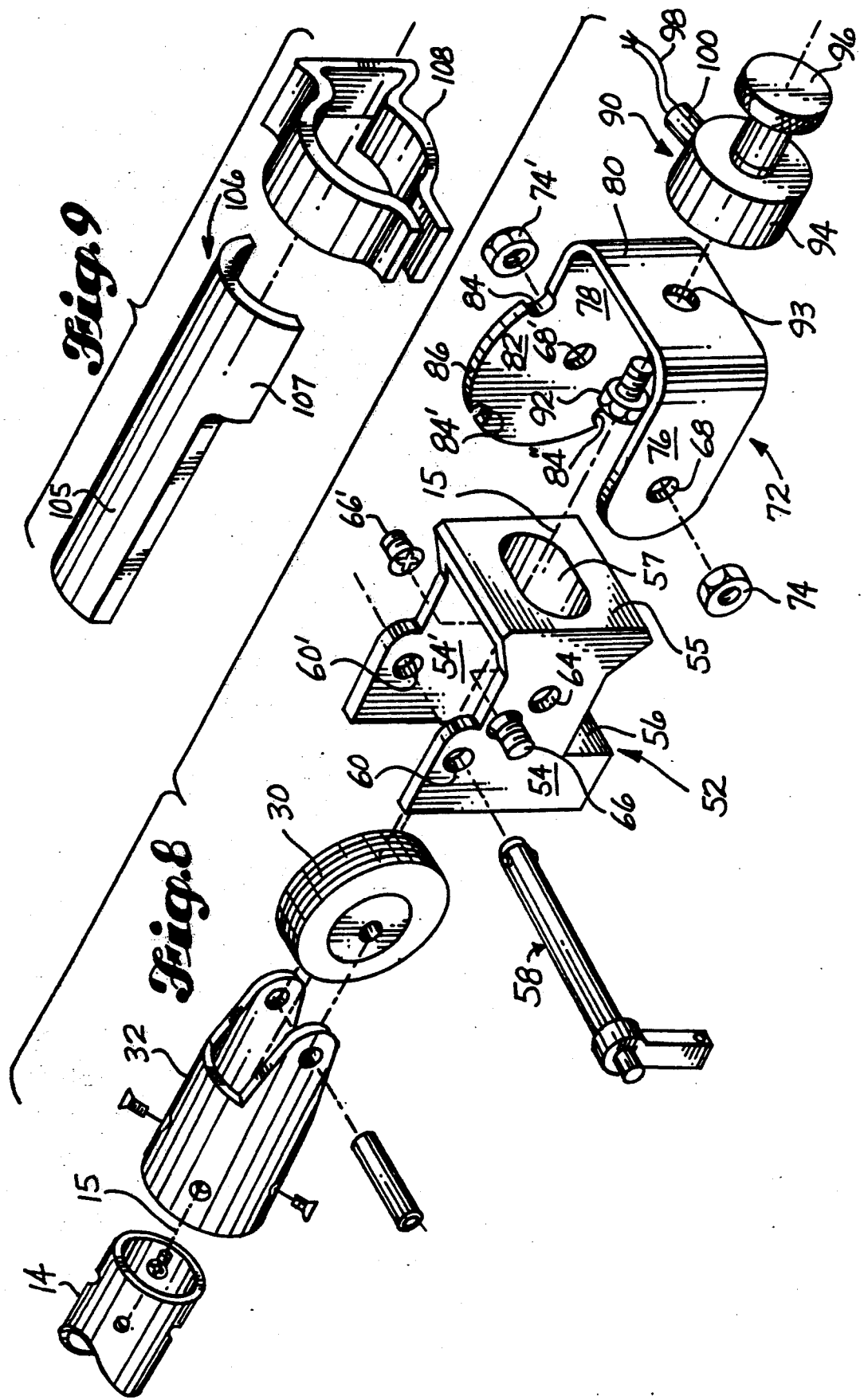

LEVER FORCE GAUGE

BACKGROUND OF THE INVENTION

This invention relates to a gauge for measuring the force exerted on a lever, and more particularly to a gauge for measuring the force required to pull a landing gear control lever to an extended position and to pivot the lever to either of its two control positions.

The landing gear on certain commercial airplanes is controlled from the cockpit by a landing gear control lever. This lever is pivotally mounted in the control panel of the cockpit for pivotal movement between a center "off" position, a raised position in which the hydraulic actuators are pressurized to raise or retract the landing gear, and a lowered position in which the hydraulic actuators are pressurized to lower or extend the landing gear. To prevent accidental movement of the landing gear control lever, it is designed to require that the lever be pulled out to an extended position before it can be pivotally moved to either the "up" or "down" position.

To facilitate the easy gripping of the end of the control lever so that it may be pulled to its extended position and then pivoted up or down to either control position, it is provided with a grip roller which is small enough that it does not encumber or clutter the front of the control panel but provides a secure and comfortable grip of the end of the control lever.

One of the quality control procedures for the manufacturing of airplanes is to insure that the force necessary to move the landing gear control lever is within design specifications. This is normally in the range of 7-10 pounds which insures that the lever can be easily and quickly moved when desired but that the force necessary to move the lever is sufficient to prevent its accidental or inadvertent movement by being bumped or the like.

The conventional technique for measuring the force necessary to move the lever used a spring scale which was attached to the end of the lever. The operator pulled on the end of the spring scale while watching the scale indicator to measure the force necessary to move the lever. This technique was inaccurate because the scale would show only momentarily the peak force exerted and required a skilled and experienced operator to obtain data with acceptable reliability. Even more importantly, the control panel of the cockpit in which the lever is installed has adjacent surfaces closely overhanging and underlying the space into which the control lever extends which make it very awkward to position the spring scale in line with the direction of movement of the lever so that the measured force would actually measure the force necessary to be exerted on the lever in the direction of motion.

Measurement precision of the force necessary to move the lever is advantageous not only because of the desire to maintain manufacturing processes within specification, but also because of the information that it reveals about the use of the hydraulic controllers and actuators in the system. The controllers for the actuators are designed to be essentially zero force movement controllers, meaning that the force necessary to move the actuator controller should be near zero. It is most convenient to measure the force necessary to move an actuator controller as installed in a operating system by measuring the force on the control lever, and therefore the instrument for measuring that force must be very precise to reveal the desired information about the controllers in the installed system.

Thus, there has long been a need in the industry for a gauge that will measure the force necessary to move a lever about its pivot point in such a way that the force exerted on the lever can be applied conveniently and quickly in the correct direction despite the confined position in which the lever is mounted. The instrument must be highly accurate and be capable of storing the desired information for reading and recording after the measurement is taken. The instrument should be capable of recording both tension and compression forces since the position of the lever may in some instances require that the force exerted on the lever be a pull and in other instances a push. The instrument should be easily mounted and dismounted from the landing gear control lever and, when mounted, be securely fixed to the lever. Finally, it should be small and light to facilitate its use in a cramped confines of the cockpit, should be inexpensive to manufacture, and be rugged for long use in the factory.

SUMMARY OF THE INVENTION

Accordingly, it is an object of this invention to provide an improved landing gear force gauge for measuring the force necessary to pivot a landing gear control lever about its pivot point.

It is another object of this invention to provide a lever force gauge which can be oriented in any of a plurality of positions to provide a measurement for force exerted in any of a plurality of directions on the lever.

It is yet another object of this invention to provide a method of measuring the force exerted on a lever which is convenient and practical for factory use and provides accurate reliable readings to insure that manufacturing is within specifications.

It is still another object of the invention to provide a small compact and inexpensive force lever gauge which is convenient and easy for the operator to use and produces accurate results in all of its positions of use.

These and other objects of the invention are obtained in a lever force gauge having a connector for connecting the gauge to the end of a lever and a positioner pivotally attached to the connector for orienting a load cell in any one of three positions for exerting force on the lever in the direction it is designed to move. A pin locks the connector to the lever and also locks the positioner at the selected position. The load cell is connected to a read out instrument by a plug assembly which has a switch for connecting the load cell to the read out instrument to provide an indication of force exerted on the lever in either tensile or compressive loading.

DESCRIPTION OF THE DRAWINGS

The invention and its many objects and advantages will become better understood upon reading the following description of the preferred embodiment in conjunction with the following drawings, wherein:

FIG. 2 shows a cross sectional schematic of a landing gear control lever in the neutral position;

FIG. 3 is a schematic similar to FIG. 2, but showing the landing gear control lever in its raised position and, in dotted lines, in its lowered position;

FIG. 5 is a view similar to FIG. 2, but showing the landing gear control lever in an intermediate position and showing the force gauge mounted on the end of the lever and a holdout bar in place holding the lever in its extended position;

FIG. 8 is a exploded perspective view of the lever force gauge shown in FIG. 7;

FIG. 9 is a perspective view of the holdout bar and spring illustrated in FIG. 5;

DESCRIPTION OF THE PREFERRED EMBODIMENT

Figure 1:
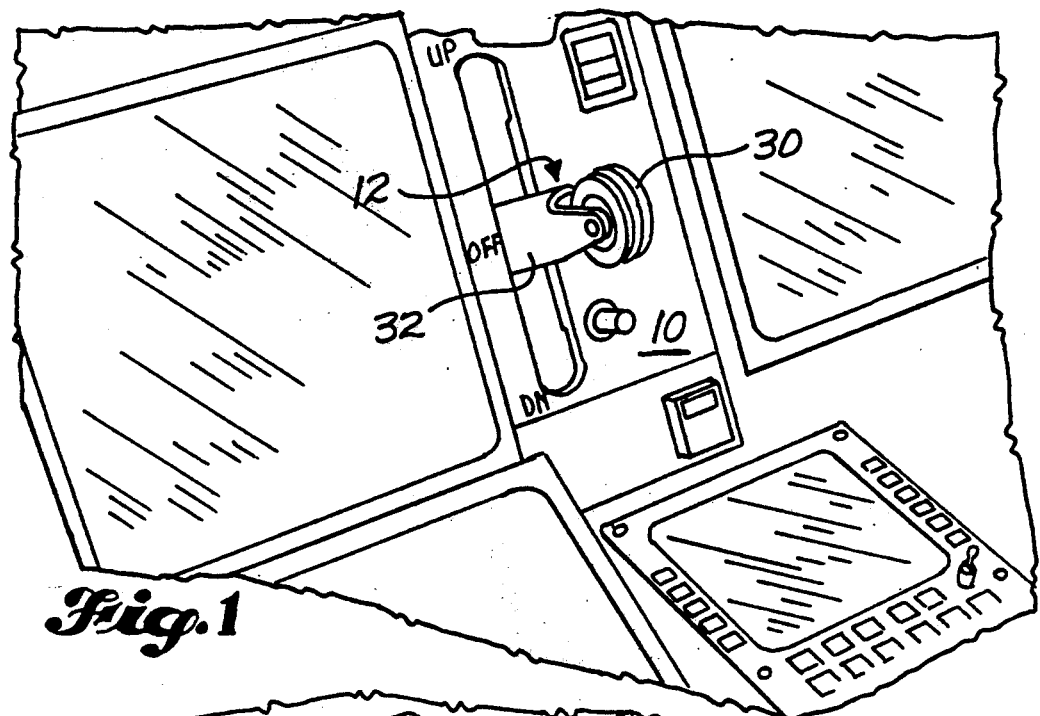
FIG. 1 is a perspective view of a portion of an airplane cockpit control panel showing a landing gear control lever.

Referring now to the drawings wherein like or primed reference characters identify the same or corresponding parts, and more particularly to FIGS. 1 and 2 thereof, a portion of an airplane cockpit control panel 10 as shown having mounted therein and protruding therefrom a landing gear control lever 12 which is used by the pilot to raise (retract) or lower (extend) the airplane landing gear. The control lever includes a lever shaft 14 slideably mounted in a center sleeve 16 which is pivotally mounted for rotation about a sleeve pivot axis 18 in a housing 20 behind the aircraft cockpit control panel 10. A crank arm 22 is connected to the center sleeve 16 for a rocking motion about the sleeve pivot axis 18 when the center sleeve rotates about the axis 18.

The lever shaft 14 is slideably mounted in the center sleeve 16 between a retracted position shown in solid lines and an extended position shown in dotted lines in FIG. 2. A compression spring 24 encircles the lever shaft 14 and urges the lever shaft 14 toward its retracted position. A series of three notches 26U, 26C, and 26L is provided in the housing 20 to receive and hold a detent 28 which holds the lever shaft 14 in one of the three positions shown in FIGS. 2 and 3.

A roller grip 30 is mounted on the end of the lever shaft 14 by a fitting 32. The roller grip 30 provides a comfortable and secure grip for the hand of the pilot when operating the control lever 12. To move the lever, the pilot grasps the roller grip 30 and pulls the grip straight out along the longitudinal axis 15 of the shaft 14, compressing the spring 24 and disengaging the detent 28 from the notch 26U. He then moves the free end of the shaft to which the roller grip 30 is attached either up or down, as indicated in FIG. 3, depending upon whether he wishes to raise or lower the landing gear. At the end of the upward or downward motion, the detent 28 aligns with the notch 26L or 26U and the spring 24 pushes the detent 28 into the notch. The control lever 12 is thus held in the desired position to activate the landing gear actuator.

When the lever shaft 14 is raised or lowered by the pilot, it rotates about the sleeve pivot axis 18, causing the crank arm 22 to rotate, also about the sleeve pivot axis 18. Rotation of the crank arm 22 pushes or pulls a control rod 34 which is pinned at 36 to the end of the crank arm 22. The other end of the control rod 34 has a spherical rod end bearing 38 which is connected to an arm 40 of a quadrant 42 around which a cable 44 is trained and to which it is connected. The cable 44 extends down through several pulleys (not shown) to a hydraulic control valve (not shown) which controls hydraulic pressure to the landing gear control actuators. Longitudinal motion of the control rod 34 under the influence of the crank arm 22 rotates the arm 40 and the quadrant 42 which moves the cable 44 to shift the hydraulic control valve to move the landing gear to its retracted or extended position.

Figure 4:
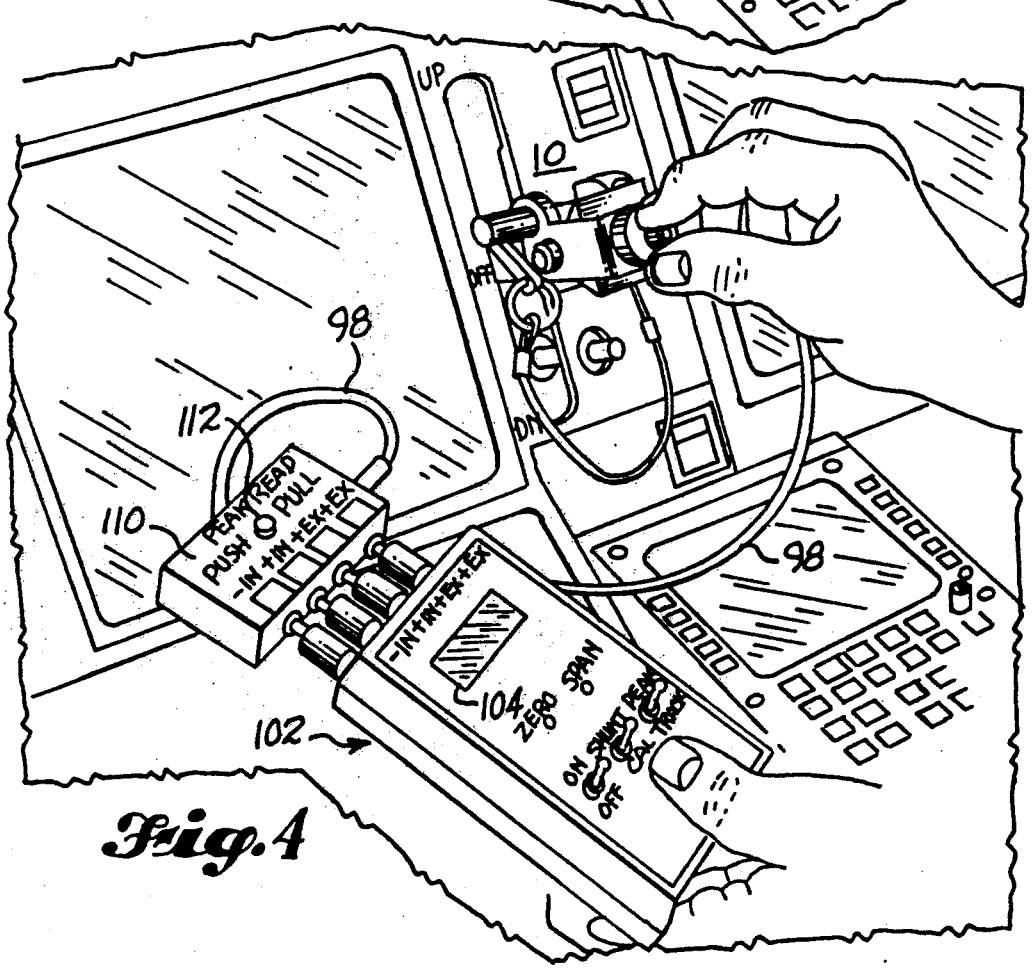
FIG. 4 is a perspective view of a lever force gauge, made in accordance with the present invention, shown mounted on the landing gear control lever shown in FIG. 1.
Figure 6:
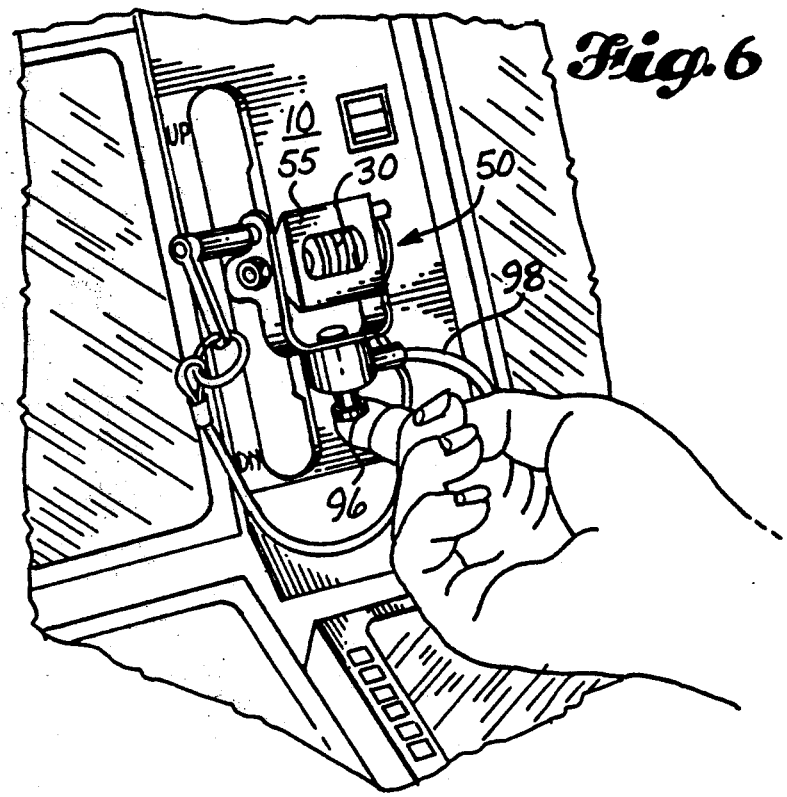
FIG. 6 is a perspective view like FIG. 4, but showing the lever force gauge in use measuring the force to pivot the lever upwardly.

A lever force gauge 50 is shown in FIGS. 4 and 5, mounted on the end of the control lever 12 with its line of action aligned with the axis 15 of the lever shaft 14. In this position, the force necessary to pull the lever shaft 14 to its extended position can be measured. In FIG. 6, the lever force gauge 50 is shown mounted in its lower position and is shown being used to measure the magnitude of the force necessary to pivot the control lever 12 upwardly.

Figure 7:
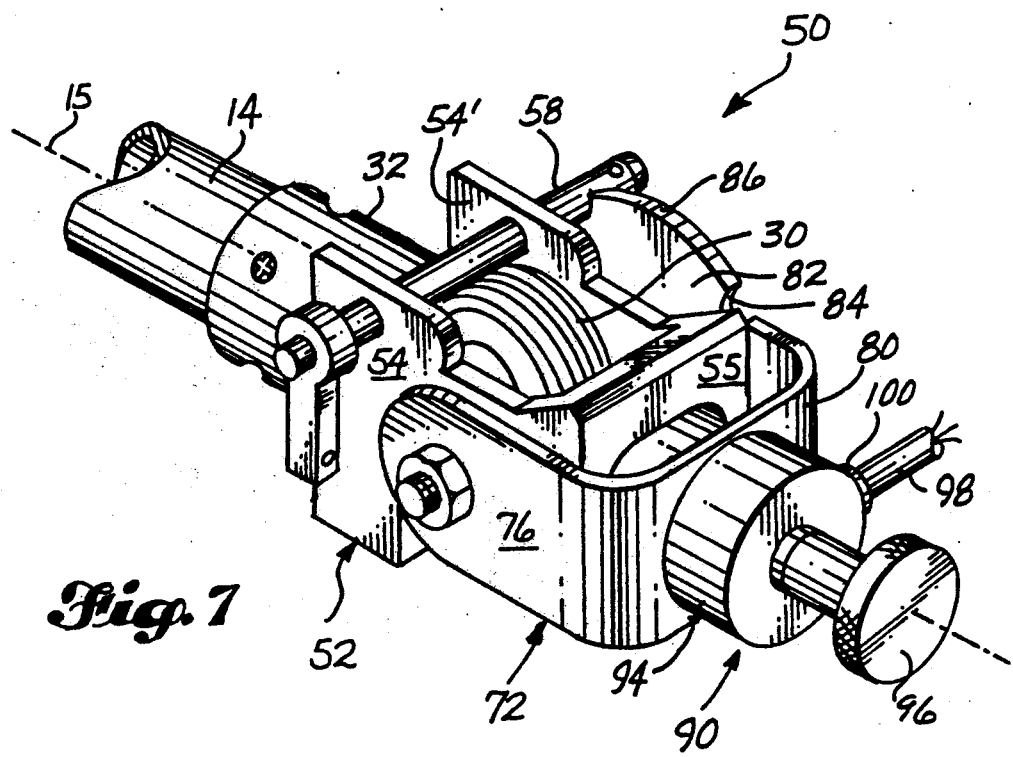
FIG. 7 is an enlarged perspective view of the lever force gauge shown mounted on the end of the landing gear control lever in the position illustrated in FIG. 4.

The lever force gauge 50, shown in detail in FIGS. 7 and 8, includes a connector 52 having a pair of laterally spaced apart sidewalls 54 and 54' which define between then an opening which receives the roller grip 30. The side walls 54 and 54' are connected at their axially outside end by an end wall 55 and at the front end along the bottom side by a cross bar 56. The end wall 55 has an outwardly converging opening 57 therethrough for engaging the roller grip 30 when the connector is mounted on the end of the control lever 12. A pin 58 extends through a pair of holes 60 and 60' in the sidewalls 54 and 54' and lies behind the roller grip 30 to cooperate with the cross bar 56 to capture the roller grip 30 within the connector 52 and hold the lever force gauge 50 on the end of the control lever 12.

Two outwardly tapering holes 64 and 64' in the sidewalls 54 and 54' each receives a machine screw 66 and 66' which extends beyond the outside surface of the sidewalls 54 and 54' and through a pair of holes 68 and 68' in a positioner 72. The positioner 72 is held on the machine screws 66 and 66' by two nuts 74 and 74'.

The positioner 72 is a generally U-shaped bracket having two parallel spaced arms 76 and 78 connected by a cross web 80. The holes 68 and 68' extend through the arms 72 and 78 to receive the screws 66 and 66' which act as the means to hold the positioner 72 on the connector 52, and also act as a pivot pin for the positioner 72 on the connector 52 which enables the positioner 72 to rotate about an axis established through the holes 64 and 64'.

The positioner 72 can be locked in any one of three desired positions by a registration disk 82 formed integrally on the end of the arm 78 and having a series of notches 84, 84' and 84" in the peripheral edge 86 of the registration disk 82. The radial distance from the axis through the center of the holes 68 and 68' to the edge of the notches 84 is equal to the distance from the center of the holes 64 and 64' to the edge of the holes 60 and 60' so that the notches 8 exactly register with the holes 60 when the positioner 72 is positioned at any of the three angular positions to be described below. The positioner can then be locked in the desired position by inserting the pin 58 through the holes 60, in which position it lies within the selected notch 84 and locks the positioner in the angular position corresponding to the selected notch 84.

A load cell 90 is attached to the cross web 80 of the positioner 72 by a screw 92 which extends through a hole 93 in the web 80. The load cell includes a cylindrical load cell body 94 having a line of action coincident with the cylindrical axis of the load cell body 94. A knob 96 is attached to the load cell body 94 for use by the operator in exerting a tensile or compressive force (a push or a pull) on the load cell 90 along its line of action and through it to the positioner 72, the connector 52 and the roller grip 30 to the control lever 12. In this way it is possible for the operator to exert a measurable force on the control lever to determine in a simple and reliable way the magnitude of the force necessary to move the lever 12.

An electrical cable 98 is connected to the load cell body 94 through a strain relief 100. The electrical cable 98 conducts electrical signals from the load cell 90 to an instrument 102 having an indicator readout panel 104 by which the force exerted by the operator on the knob 96 can be indicated for reading by the operator.

As shown in FIGS. 4 5 and 7, the gauge may be oriented to position the load cell in axial alignment with the longitudinal axis 15 of the lever shaft 14. The positioner 72 may be oriented in this position by aligning the center notch 84' with the holes 60 and 60' in the connector 52, and then inserting the pin 58 through the holes 60 and 60', and through the notch 84' in the peripheral edge 86 of the registration disk 82 on the positioner 72. The pin in this position lies behind the roller grip 30 and, in cooperation with the cross bar 56, holds the connector 52 onto the control lever 12, and also holds the positioner 72 in the position shown in FIGS. 4 and 5 in which the load cell 90 is axially aligned with the longitudinal axis 15 of the lever shaft 14. In this position, the force necessary to pull the lever shaft 14 out to its extended position as shown in dotted lines in FIG. 2 can be measured.

A second position of the positioner 72 is illustrated in FIG. 6. In this position, the positioner 72 is oriented to position the axis of the load cell 90 at right angles to the axis of the lever shaft 14 and tangent to the arc described by the roller grip 30 when the lever 12 rotates about its pivotal axis 18. In this position, the operator can push on the knob 96 as illustrated in FIG. 6 to obtain a measurement of the magnitude of the force necessary to move the lever upward from the central "off" position illustrated in FIGS. 2 and 6. To put the positioner 72 in this position, the pin 58 is withdrawn and the positioner 72 is rotated downward to align the notch 84" with the holes 60 and 60'. The pin 58 is then reinserted through the holes 60 and 60' and through the notch 84" to lock the positioner 72 in this position.

The third position of the lever force gauge 50 (not illustrated) is that in which the positioner is rotated upwardly to orient the load cell 92 at right angles to the axis of the lever shaft 14 with knob 96 above the lever shaft 14. In this position, the operator may press downward on the knob 96 to obtain a measurement of the magnitude of the force necessary to move the lever downward.

As noted previously, the compression spring 24 urges the detent 28 into the notches 26 when the axis 15 of the lever shaft 14 is aligned with those notches. In this position it is necessary to pull the lever shaft outwardly to clear the detent 28 from the notches 26 before the lever shaft can be rotated about its pivot axis 18. In order to hold the lever shaft 14 in its extended position in which the detent 28 is clear of the notches 26 as shown in FIG. 5, a holdout bar 106 is provided which is sized to be inserted between the shoulder provided by the inner end of the fitting 32 and the outer end of the center sleeve 16 and to hold the lever shaft 14 out far enough to lift the detent 28 clear of the notches 26. The detent, shown in FIG. 9, includes an axially elongated portion 105 and an enlarged end portion 107, and is laterally curved to fit snuggly against the lever shaft 14. A spring clip 108 is provided to encircle the enlarged end portion 107 an hold the holdout bar 106 on the lever shaft 14 while it is in this position to facilitate the taking of the necessary measurements by the operator. The spring clip 108 is coated with plastisol to prevent scratches on the lever shaft 14.

Figure 10:
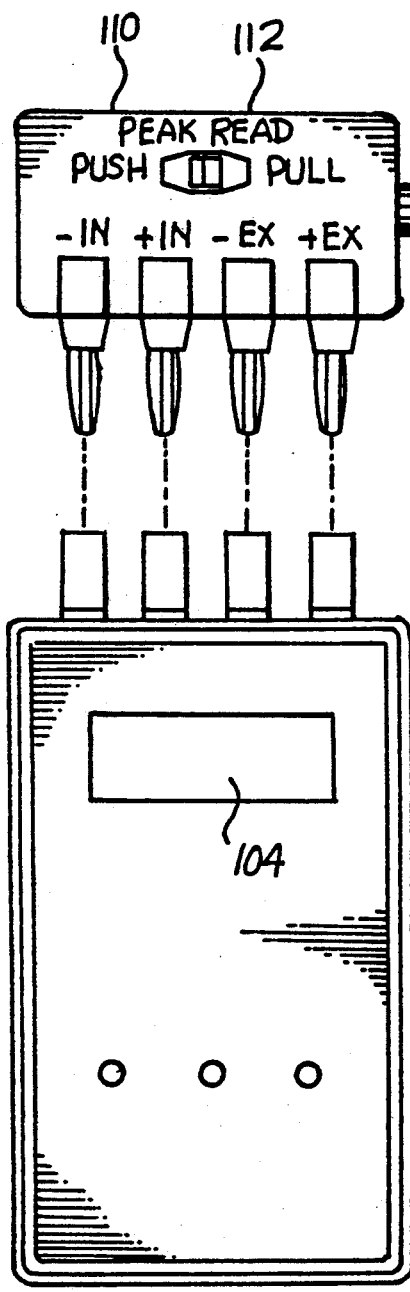
FIG. 10 is an exploded view of the instrument and plug assembly illustrated in FIG. 4.
Figure 11:
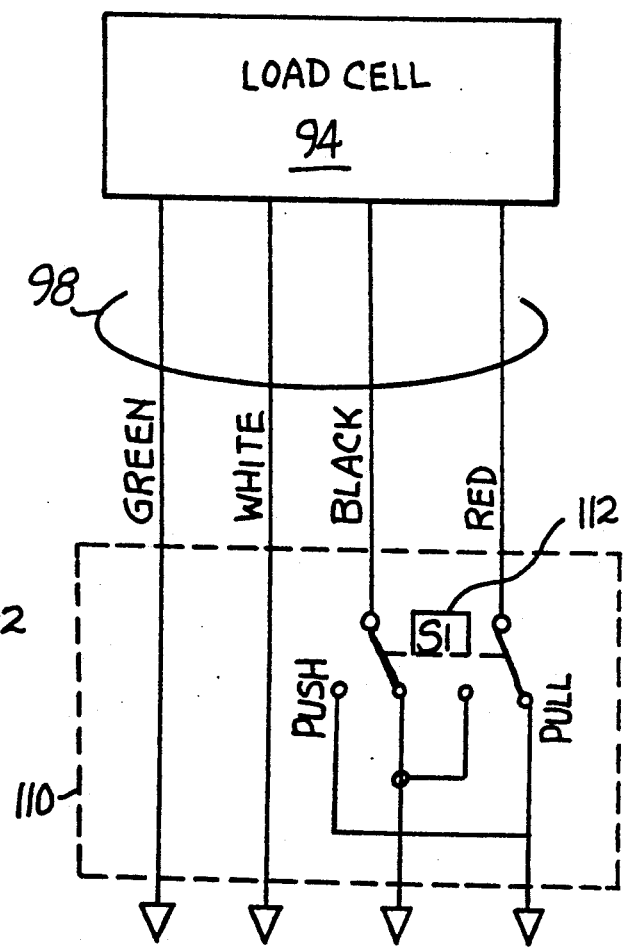
FIG. 11 is a schematic electrical diagram of the plug assembly illustrated in FIG. 10.

The instrument 102 shown in FIG. 4 can be a Sensotec Model HH available from Seltech, in Bellevue, Wash. This instrument can measure the peak force exerted on the load cell 90 or, if desired, can merely track the force exerted on the load cell. As used in the present invention, the toggle switch is normally placed in the "peak" position to indicate the peak force exerted on the load cell knob 96 by the operator. A plug assembly 110, shown in FIG. 10, is provided with four banana plugs which mate with the four sockets on the instrument 102. The plug assembly receives the other end of the electrical cable 98 and includes a switch which can be positioned by the operator in either of two positions: a "push" position or a "pull" position. If the operator intends to exert a tensile or a pulling force on the knob 96 as illustrated in FIG. 4, he will place the switch on the plug assembly 110 in its "pull" position. If the operator is planning to position the load cell in the orientation shown on FIG. 6 in which he plans to push on the knob 96 to obtain the measurement of the force magnitude necessary to move the lever upwardly, the operator places the switch in the plug assembly 110 in its "push" position. The purpose of the switch, as shown in the wiring schematic for the plug assembly shown in FIG. 11, is to switch the positions of the wires feeding the signal from the load cell transducer to the instrument 102 so that a positive reading in force exerted on the knob in either tensile or compressive force can be indicated by the instrument 102 on the indicator 104.

In operation, the operator attaches the lever force gauge 50 on the roller grip 30 on the fitting 32 at the end of the lever shaft 14 by placing the connector 52 over the roller grip 30 and inserting the pin 58 through the holes 66 and the aligned notches 84'. In this position of the positioner 72, the load cell 90 is aligned with the axis 15 of the lever shaft 14 so that a pull by the operator on the knob 96 of the load cell 90 will be transmitted through the positioner 72 and the connector 52 to the lever shaft 14 in a direction directly aligned with the axis of the lever shaft 14. The operator moves the slide switch 112 on the plug assembly 110 to the "pull" position and pulls on the knob 96 as illustrated in FIG. 2. The instrument 102 records the peak force exerted by the operator on the knob 96 and the operator then records indicated force which is held on the indicator 104 in his test log.

The operator now pulls the lever shaft 14 out to its extended position as illustrated in FIG. 5, and places the holdout bar 106 on the lever shaft 14 between the center sleeve 16 and the end fitting 32. The spring clip 108 and the holdout bar now holds the holdout bar in place on the lever shaft for the balance of the test.

With the holdout bar holding the landing gear control lever 12 in an extended position, the detent 28 is clear of the notches 26 so the lever may be rotated upward or downward according to the operator's test plan. Assuming that his next data point is the force necessary to raise the lever from its center position to the upper position, the operator places the positioner 72 in the position shown in FIG. 3 and places his finger on the knob 96 as shown in FIG. 3, and exerts a gradually increasing force upward on the knob until the landing gear control lever 12 begins moving upward. The operator then reads on the indicator 104 on the instrument 102 what the peak force exerted by him on the knob to move the lever 12, and records that peak force on his test record. The operator now perhaps will want to record the force necessary to move the lever from its upper most position down toward its center position. He will move the lever to its uppermost position but, because of the overhanging compartment 114 as shown in FIG. 3, it would be difficult to push downward on the knob 96 in the upright position of the positioner 72, so the operator swings the positioner 72 to its downward position illustrated in FIG. 6. In this position, the line of action of the load cell 92 is aligned with the tangent of the ark described by the roller grip 30. The shift of the positioner is done in the same manner as noted previously, by withdrawing the pin 58 and swinging the positioner 72 to the downward position in which the notch 84 is aligned with the axis of the holes 60 and 60', and then reinserting the pin 58. The operator shifts the position of the "push-pull" slide switch 112 on the plug assembly 110 and can now pull downwardly on the knob 96 with gradually increasing force until the lever moves from its uppermost position toward the center position, and read the peak tensile force he exerted on the knob to move the lever.

Again, the operator records the reading indicated on the indicator 104 and then clears the indicator for the next measurement by cycling either the "on-off" toggle or the "peak-track" toggle. Finally, the operator's last measurement might be to record the force necessary to move the lever from its lowermost position toward the center position. He repositions the positioner 72 to its upright position with the load cell 92 located above the end fitting 32, and can now pull upwardly on the knob 96 to obtain the measurement of the force magnitude necessary to move the lever. In this way, the close adjacency of the surface of the console 116 does not prevent the operator from gaining access to the knob 96 as it might if it were in its downwardly facing position as shown in FIG. 6.

Obviously, numerous modifications and variations of the preferred embodiment will occur to those skilled in the art in view of this disclosure. Accordingly, it is expressly understood that these modifications and variations, and the equivalents thereof, may be practiced without departing from the spirit and scope of the appended claims, wherein

I claim:

1. A lever force gauge, comprising:
a connector for connecting said gauge to an end of a lever;
a load cell having a knob, said load cell producing signals proportional to the magnitude of compression or tensile forces exerted on said knob;
an instrument having an indicator for converting said signals from said load cell to a numerical readout indicative of the forces exerted on said load cell;
a positioner attached to said connector for orienting said load cell in any selected one of a plurality of positions;
whereby said load cell is stressed by forces thereon exerted through said knob and transmitted through said load cell to said lever to determine the force necessary to move said lever as indicated on said indicator.

2. A lever force gauge as claimed in claim 1, wherein: said connector having a pair of spaced-apart walls for bracketing a grip roller on said end of said lever, said spaced-apart walls having an aligned hole therethrough for receiving a locking pin behind said grip roller after said connector has been placed on said lever with said grip roller within said spaced apart walls to lock said grip roller in place and prevent said connector from being pulled off of said lever.

3. A lever force gauge as claimed in claim 1, wherein: said load cell is attached to said positioner, and said positioner includes a bracket pivotally connected to said connector and having registration recesses for locking said positioner in position to face said load cell in any selected one of three positions: in either of two positions facing at right angles to the axis of said lever, and axially in line with said lever.

4. A lever force gauge as claimed in claim 3, wherein: said bracket includes a pair of center holes by which said bracket is pivotally connected to said connector, and a circular edge at a fixed radius from said center holes;
said registration recesses include notches in said circular edge of said bracket which align with a hole in said connector for receiving a locking pin;
whereby said positioner bracket can be oriented to face said load cell in the desired direction and said locking pin can be inserted through said connector hole and said aligned notch to lock said positioner bracket in said desired position on said connector.

5. A lever force gauge as claimed in claim 1, wherein: said positioner includes a bracket having two spaced apart arms bracketing said connector and pivotally connected thereto on a pivot axis, one of said arms having a registration disc at one end of said arm, said registration disc having a semicircular edge around which said registration recesses are spaced;
said connector has a pair of spaced apart walls lying parallel and adjacent to said bracket arms and having a pair of aligned holes therethrough at a radial distance from said pivot axis equal to the radial distance of said notches in said registration disc from said pivot axis; and
a pin extends through said aligned holes and through one of said notches to hold said positioner in a desired position.

6. A lever force gauge as claimed in claim 5, wherein: said positioner includes a cross web connecting said spaced apart arms at the other end thereof, and said load cell is attached to said positioner on said cross web.

7. An instrumented landing gear control lever having a lever shaft with an outer free end and a roller grip mounted on said outer free end; an end fitting for mounting said roller grip on said outer free end; a center sleeve in which said lever shaft is slideably mounted for movement between an extended position and a retracted position; a spring surrounding said lever shaft and connected thereto for urging said lever shaft toward the retracted position thereof; a crank arm attached to said center sleeve and pinned to an actuator control rod for rotating an actuator control member when said lever shaft is rotated about an axis of rotation normal to and intersecting said center sleeve axis; wherein the improvement comprises:

a connector for mounting on said outer end of said lever shaft over said roller grip;

a load cell mounted on a positioner, said positioner pivotally connected to said connector for swiveling between a position in which said load cell faces the tangent of the arc which said roller grip describes when said control lever is rotated about said axis of rotation, and a position in which said load cell is aligned with said longitudinal axis of said lever shaft;

an instrument having an indicator for indicating the magnitude of the peak force exerted on said load cell by an operator, and recording said peak force for observation by said operator.

8. An instrumented landing gear control lever as defined in claim 7, wherein:

said connector includes a fastener for securing said connector to said outer end of said lever shaft; and said positioner includes a fastener for securing said positioner in a desired position to orient said load cell in a desired position.

9. An instrumented landing gear control lever as defined in claim 8, wherein:

said connector fastener and said positioner fastener are both embodied in a single pin which extends through a pair of holes in said connector behind said roller grip to hold said connector onto said outer end of said lever shaft, and also extends through a notch on said positioner to prevent said positioner from moving from the position engaged by said pin in said notch.

10. An instrumented landing gear control lever as defined in claim 7, wherein:

said connector includes a pair of spaced apart side walls connected at one axial end by an end wall, said side walls receiving said roller grip between them when said connector is mounted on said control lever.

11. An instrumented landing gear control lever as defined in claim 10, wherein:

said connector includes a cross bar adjacent the opposite axial end from said one axial end on one lateral side of said connector, and a removable pin which is insertable through two aligned holes through said side walls on the lateral side opposite said one lateral side, said pin and said cross bar capturing said roller grip and releaseably holding said connector on said control lever.

12. An instrumented landing gear control lever as defined in claim 10, wherein:

said positioner includes a U-shaped bracket having a pair of spaced apart arms bracketing said connector side walls and pivotally connected thereto by a pair of laterally aligned machine screws;

one of said positioner arms being enlarged at an inner axial end to a semicircular registration disc having a plurality of notches in the peripheral edge thereof for receiving a removable pin which extends through a pair of aligned holes in said connector side walls to releaseably hole said positioner in a desired position corresponding to the position of said notch on said registration disc.

13. An instrumented landing gear control lever as defined in claim 9, further comprising:

a hold-out bar having an axially elongated, laterally curved bar portion and an enlarged end portion, said hold-out bar having a length sufficient to hold said lever shaft in said extended position thereof when said hold-out bar is laid alongside said lever shaft between said end fitting and said center sleeve, said hold-out bar further including a retention spring clip to releaseably hold said hold-out bar on said lever shaft.

14. A method of measuring the force to move a landing gear control lever, comprising:

attaching a load cell to an end of said lever;

orienting said load cell in any selected one of a plurality of positions on said lever and in a desired direction so that when a tensile or compressive force is exerted on said load cell, said force will be transmitted through said load cell on said lever in said desired direction;

exerting an increasing force on said load cell in said desired direction until said lever starts to move;

generating a signal in said load cell proportional to said force exerted on said load cell;

transmitting said signal to an instrument having an indicator for converting said signal to a numerical readout indicative of the highest force exerted on said load cell;

producing a numerical readout on said indicator which is indicative of the force exerted on said lever at the moment said lever moved; and storing said readout on said indicator for reading by an operator after movement of said lever.

15. A method as defined in claim 14, wherein:

said attaching step includes securing said load cell to a connector and inserting a pin through two legs of said connector behind a roller grip on said end of said lever to hold said connector on said end of said lever.

16. A method as defined in claim 15, wherein:

said securing step includes connecting said load cell to a positioner which is pivotally mounted on said connector.

17. A method as defined in claim 16, wherein:

said orienting step includes pivoting said positioner to a desired position at which the line of action of said load cell is aligned with the desired direction of said lever movement, and locking said positioner at said desired position.

18. A method as defined in claim 17, wherein:

said locking step includes inserting said pin through a notch in an edge of said positioner as well as through said two legs of said connector to lock said positioner in said desired position on said connector.

19. A method as defined in claim 17, wherein:

said pivoting step includes rotating said positioner about a pivot axis through a pair of machine screws holding said positioner to said connector.

20. A method as defined in claim 14, further comprising:

pulling said lever out to an extended position thereof; and holding said lever in said extended position while performing said exerting step, said holding step including laying a hold-out bar alongside said lever between two shoulders thereon to prevent said lever from retracting to a retracted position thereof.

* * * * *